United States Patent [19]

Gregg et al.

[11] 4,093,091
[45] June 6, 1978

[54] LOAD MOMENT SENSING SYSTEM FOR LIFT TRUCKS

[75] Inventors: Edmund Gregg, Willowick; Grant C. Melocik, Chardon, both of Ohio

[73] Assignee: Towmotor Corporation, Mentor, Ohio

[21] Appl. No.: 701,336

[22] Filed: Jun. 30, 1976

[51] Int. Cl.² ............................................... B65G 47/00
[52] U.S. Cl. .................................. 214/673; 340/267 C
[58] Field of Search ........................ 214/660, 670–674; 212/39 R, 39 MS; 340/267 C

[56] References Cited

U.S. PATENT DOCUMENTS

| 2,751,994 | 6/1956 | Remde | 214/674 X |
| 3,831,492 | 8/1974 | Young | 214/674 X |
| 3,850,322 | 11/1974 | Ekstrom | 214/673 |
| 3,866,200 | 2/1975 | Paredes et al. | 340/267 C X |
| 3,960,286 | 6/1976 | Spooner et al. | 214/674 |
| 3,993,166 | 11/1976 | Senour | 340/267 C X |
| 4,003,487 | 1/1977 | Downing | 214/673 |

Primary Examiner—Drayton E. Hoffman
Assistant Examiner—R. B. Johnson
Attorney, Agent, or Firm—Wegner, Stellman, McCord, Wiles & Wood

[57] ABSTRACT

An improved load moment sensing system for a lift truck having tilt and lift cylinders for tilting a mast and lifting a carriage on the mast, respectively. A sensor is provided for sensing the load moment placed on the frame and a sensor is provided for determining when the carriage is elevated on the mast. A logic system is responsive to the sensors for preventing actuation of the tilt and lift cylinders simultaneously when an overload is sensed while allowing rearward tilting only when an overload has been sensed and when the carriage is elevated. The system also prevents tilting forwardly when an overload has been sensed and when the carriage is elevated. The system also allows tilting forwardly when an overload has been sensed and the carriage is not elevated.

5 Claims, 3 Drawing Figures

LOAD MOMENT SENSING SYSTEM FOR LIFT TRUCKS

BACKGROUND OF THE INVENTION

This invention relates to lift trucks and, more particularly, to overload moment sensing systems for use in lift trucks.

Prior art of possible relevance includes U.S. Pat. No. 2,751,994 of June 26, 1956, and U.S. Pat. No. 2,774,437 of Dec. 18, 1956, both to Remde; U.S. Pat. No. 3,032,221 of May 1, 1962 to Carliss et al; U.S. Pat. No. 3,831,492 of Aug. 27, 1974 to Young; U.S. Pat. No. 3,850,323 of Nov. 26, 1974 to Eckstrom; and U.S. Pat. No. 3,866,419 of Feb. 18, 1975 to Paul.

Lift trucks have increased greatly in popularity due to their maneuvering ability and load carrying capacity. As is well known, the typical lift truck includes a mast pivoted to the front end of the vehicle for fore and aft tilting movement thereon. A carriage is provided with a fork or the like and is mounted for up and down movement on the mast and hydraulic cylinders are employed for both tilting the mast and elevating the carriage.

Because the load is carried forwardly of the front wheels of the vehicle, increased loading on the platform increases the tendency of the lift truck to become overloaded in its forward direction.

Various means have been provided for warning the operator of a lift truck of an overload condition and/or for varying the operation of the lift truck to preclude an overload condition from occurring. The above identified prior art typifies the approaches taken.

One significant difficulty in many of the approaches is the use of valves responsive to pressure variations. Because such elements necessarily are mechanical in nature, sticking of the valves or other causes of mechanical failure can render such systems inoperative.

In addition, many are designed in such a way that an overzealous operator can, if desired, override the system to create a situation which the system was designed to prevent.

SUMMARY OF THE INVENTION

It is the principal object of the invention to provide a new and improved lift truck construction. More specifically, it is an object of the invention to provide an improved overload moment sensing system in connection with lift truck constructions.

An exemplary embodiment of a lift truck including a load moment sensing system made according to the invention includes a vehicle frame having ground engaging means, normally in the form of wheels, on the frame so that it may traverse the underlying terrain. An upright mast is adjacent the front end of the frame and is pivoted thereto about a substantially horizontal axis. A lift carriage is mounted on the mast for up and down movement thereon and a first motor, typically a double-acting hydraulic cylinder, is employed for tilting the mast toward and away from the frame about the horizontal axis.

A second motor, normally in the form of a hydraulic cylinder, is employed for moving the lift carriage up and down on the mast.

Selectively and manually operable controls, typically hydraulic valves, are employed for controlling the motors and an overload sensing means is located on the frame. Additionally, means are provided for sensing when the carriage is elevated on the mast and there is provided a logic system responsive to the sensing means which prevents simultaneous energization of the first motor for tilting in either direction and the second motor for lifting when an overload has been sensed, allows energization of the first motor for tilting toward the frame when an overload has been sensed and when the carriage is elevated, and allows energization of the first motor for tilting in either direction when an overload has been sensed and the carriage is not elevated.

In a preferred embodiment, the overload sensing means comprises an electrical transducer and the logic system comprises a series of electrical logic gates. There is further provided a low pass filter in circuit with the transducer and the gates for precluding false indications of an overload due to vehicle vibration, changes in direction of the vehicle, bumps in the terrain over which the vehicle is moving, etc.

In a preferred embodiment, there is a hydraulic pump for the motors when the same are in the form of a hydraulic cylinder and there is an electrical motor for driving the pump. The logic system is operative to cause the previously mentioned functions to occur by energizing or de-energizing the electrical motor.

Other objects and advantages will become apparent from the following specification taken in connection with the accompanying drawings.

DESCRIPTION OF THE PREFERRED EMBODIMENT

Figure 1:
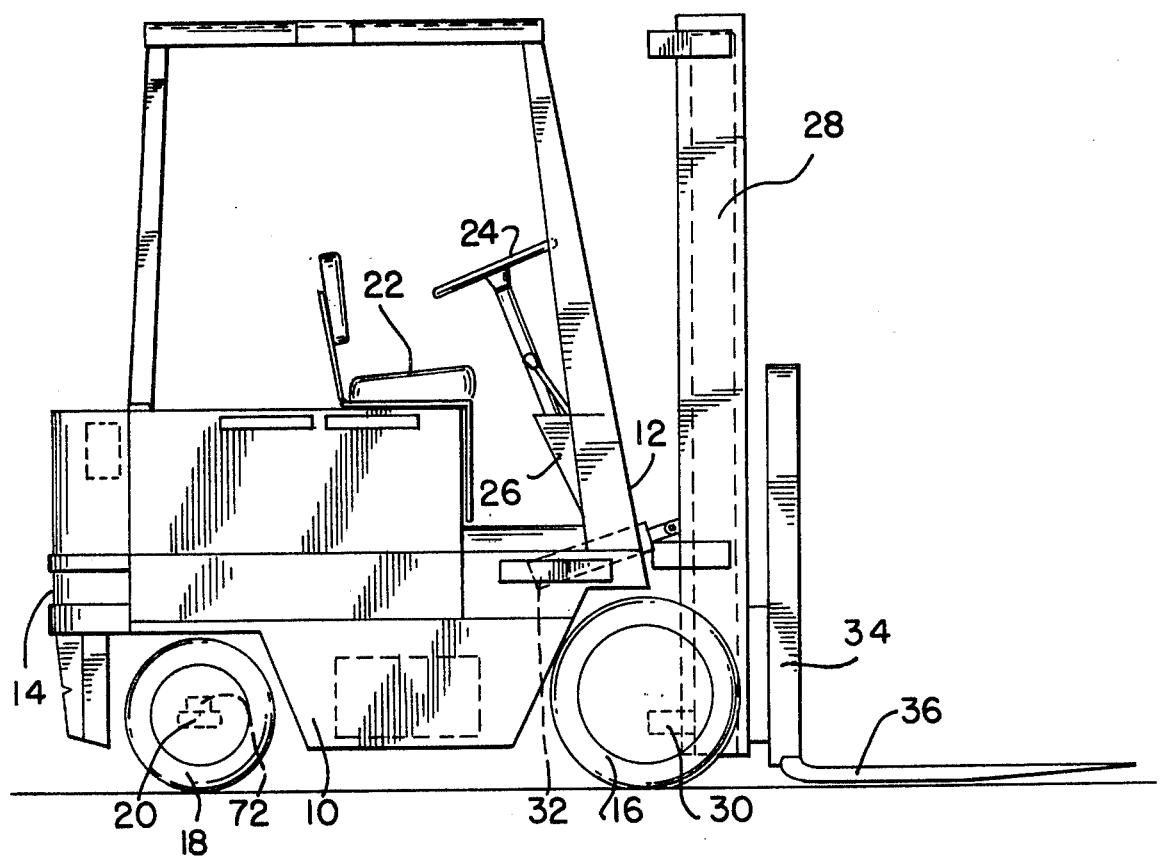
FIG. 1 is a side elevation of a lift truck made according to the invention.

An exemplary embodiment of a lift truck made according to the invention is illustrated in FIG. 1 and includes a vehicle frame 10 having a front 12 and a rear 14. The frame is provided with front wheels 16 and rear wheels 18, the latter being mounted on an axle 20 which may be of conventional construction. The vehicle includes an operator's seat 22 and a steering wheel 24 along with a control console 26 whereby operations of the vehicle may be suitably controlled.

At the front end 12 of the vehicle, there is mounted an upwardly extending mast 28. The mast 28 is pivoted at its lower end as at 30 to the vehicle frame in a conventional fashion for rotation about a generally horizontal axis whereby the mast 28 may be tilted toward or away from the frame. To accomplish such tilting movement, two double-acting hydraulic cylinders 32 are interposed between the frame and the mast 28 and are suitably pivotally connected to both, as is well known.

Figure 2:
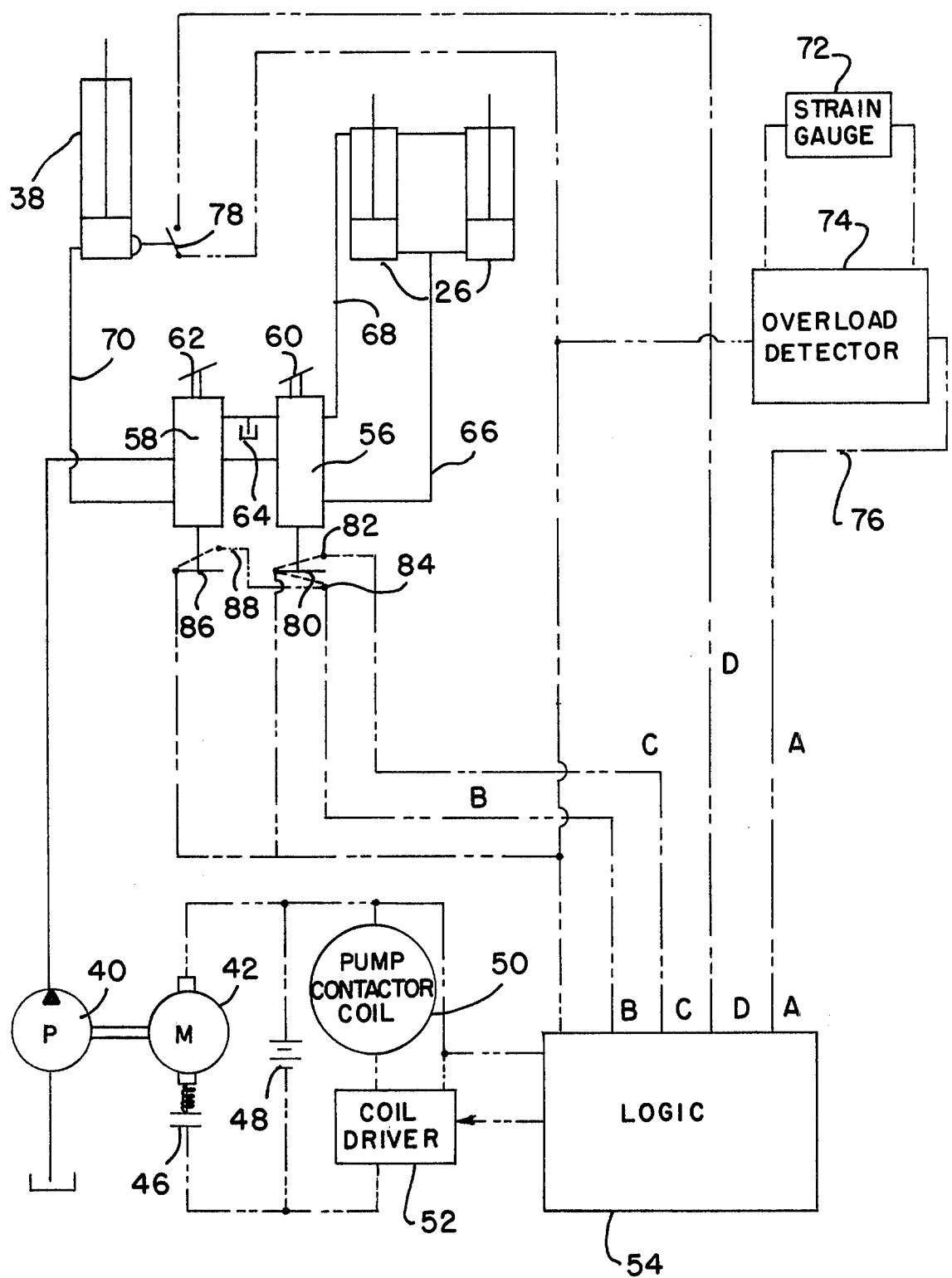
FIG. 2 is an electrical and hydraulic schematic of the load moment sensing system.

A carriage 34 is mounted on the mast 28 for vertical movement thereon and may support a fork or a platform 36 or any other desired load carrying device. As seen in FIG. 2, a single-acting hydraulic cylinder 38 is employed to raise or lower the carriage 34 on the mast 28. The cylinder 38 is mounted on the mast 28 in a conventional fashion.

In the illustrated embodiment, hydraulic fluid under pressure for operation of the cylinders 26 and 38 is provided by a pump 40 which is driven by an electrical motor 42 in series with a set of relay contacts 46 across a battery 48. The relay contacts 46 are normally open, but may be closed when a contactor coil 50 also connected across the battery and in series with a coil driver 52 is energized. The coil driver 52 is energized by a logic system 54 under conditions to be described in greater detail hereinafter.

Control of the cylinders 26 and 38 is provided by valves 56 and 58 having manual actuators 60 and 62 respectively. The valves 56 and 58 are connected to the output of the pump 40 and to a reservoir 64. The valves 56 and 58 are three-position valves. In a neutral position of either valve 56 and 58, their associated cylinders 26 and 38 will neither be extended or retracted. When the valve 56 is moved to a second of its positions, hydraulic fluid from the pump 40, assuming the pump 40 is being driven, is directed to a line 66 to extend the cylinders 26 to pivot the mast 28 forwardly. In a third of its positions, the valve 56 will cause the cylinders 26 to retract by supplying pressurized fluid through a conduit 68 to tilt the mast 28 rearwardly.

In a second of its positions, the valve 58 will direct fluid under pressure to a line 70 to extend the cylinder 38 to thereby elevate the carriage 34.

In the last of its positions, the valve 58 will connect the line 70 to the reservoir 64 to enable the carriage 34 to descend under its own weight and/or that of a load carried thereby.

Those skilled in the art will recognize that if the mast is tilted forwardly and the carriage 34 is elevated, the center of gravity of the overall vehicle and the load carried thereby will shift to the right, as viewed in FIG. 1. If the load is excessive, the load distribution on the wheels 16 would be greater than desirable. The invention contemplates the provision of means to detect an overload condition regardless of the attitude of the mast 28 and preclude any change in the attitude of the carriage 34 or the mast 28 that would aggravate the situation.

In particular, a strain gauge 72 is associated with the rear axle 20 to sense the deflection of the same under loads. As an overload condition is approached, the deflection of the axle 28 under load will decrease and the strain gauge 72 will detect the change in deflection. As is well known, the strain gauge 72 is an electrical transducer and will provide an electrical output signal representative of the degree of deflection of the mechanical element to which it is attached.

The output from the strain gauge is directed to an overload detector 74 which is operative to provide an electrical signal whenever a load in excess of a predetermined amount, that is, a deflection of the axle 20 less than a predetermined amount, occurs. This signal is passed on an electrical line 76 to the logic system 54.

The system also includes a means for determining when the carriage 34 is elevated on the mast 28. Specifically, a pressure responsive switch 78 is associated with the cylinder 38 to sense the pressure below the piston therein. If the carriage 34 is resting on the underlying terrain, the pressure in the cylinder 38 will be virtually zero and the switch 78 will be open. On the other hand, if the carriage 34 is elevated above the underlying terrain, at the very least, the weight of the same will cause a pressure to exist below the piston in the cylinder 38 to close the switch 78.

A switch 80 is mechanically associated with the valve 56 so as to be moved to close through a contact 82 when the valve 56 is commanding the cylinders 26 to retract, that is, to tilt the mast 28 rearwardly, and to be closed through a contact 84 when the valve 56 is commanding the cylinders 26 to extend, that is, to tilt the mast 28 forwardly. The switch 80 will not be closed for the neutral position of the valve 56.

A switch 86 is mechanically coupled to the valve 58 and is arranged to be closed through a contact 88 coupled to the contact 84 when the valve 58 is commanding an extension of the cylinders 38, that is, in a position to cause the lifting of the carriage 34 on the mast 28. In all other positions of the valve 58, the switch 86 will be open.

As can be seen, electrical lines extend from the switches 78, 80 and 86 to the logic system 54 for providing electrical signals thereto. The signals from such switches and the signal from the overload detector 74 on the line 76 are designated A, B, C and D as illustrated in connection with the illustrated electrical conductors in FIG. 2. When the signal "A" is present, the same indicates that an overload condition has not been sensed. Conversely, the absence of an "A" signal indicates that an overload condition exists.

A "B" signal will exist when either the switch 80 is closed through the contact 84 or the switch 86 is closed through the contact 88. Thus, a "B" signal will be present if a lift or a tilt forward command is issued by the valves 56 or 58. Conversely, when there is no command to lift or to tilt the mast forward, there will be an absence of the "B" signal.

A "C" signal will be issued if the switch 80 is closed through the contact 82 corresponding to a command to tilt the mast 28 rearwardly. Similarly, when such a command is not present, there will be an absence of a "C" signal.

The "D" signal will exist whenever the switch 78 is closed, indicating that the carriage is not resting on the ground, that is, is elevated to a greater or lesser degree.

To preclude an overload condition from occurring, it is desired that the lift cylinder 38 be disabled to preclude lifting whenever an overload occurs. At the same time, it is desired that the lift cylinder 38 be allowed to retract, that is, to lower the carriage 34, regardless of whether an overload condition occurs.

It is also desired to disable the cylinders 26 from tilting the mast forwardly if an overload condition exists and the carriage is elevated. At the same time, it is desired that the mast 28 be enabled to be tilted in either direction when the carrige is on the underlying terrain, i.e., not elevated, so as to enable the load to be released from the platform 36, as by forward tilting.

Inasmuch as an overload condition can be alleviated by rearward tilting of the mast 28, it is desirable that the cylinders 26 can be enabled to cause such rearward tilting regardless of whether an overload condition exists. However, it is not desirable to allow rearward tilting of the mast 28 during lifting of the carriage 34 when an overload condition exists, as is typical of many prior art systems. Such would allow an overzealous operator to override the system.

Of course, it is desired to enable all cylinders to lift and tilt in either direction whenever no overload condition is present.

In conventional Boolean notation, if "F" represents enablement of the pump 40 via energization of the electric motor 42 to provide fluid under pressure, then all of the above conditions are accommodated by the following equation:

$$F = \overline{(AB)} \, \overline{(CB)} \, \overline{(BD)}$$

Figure 3:
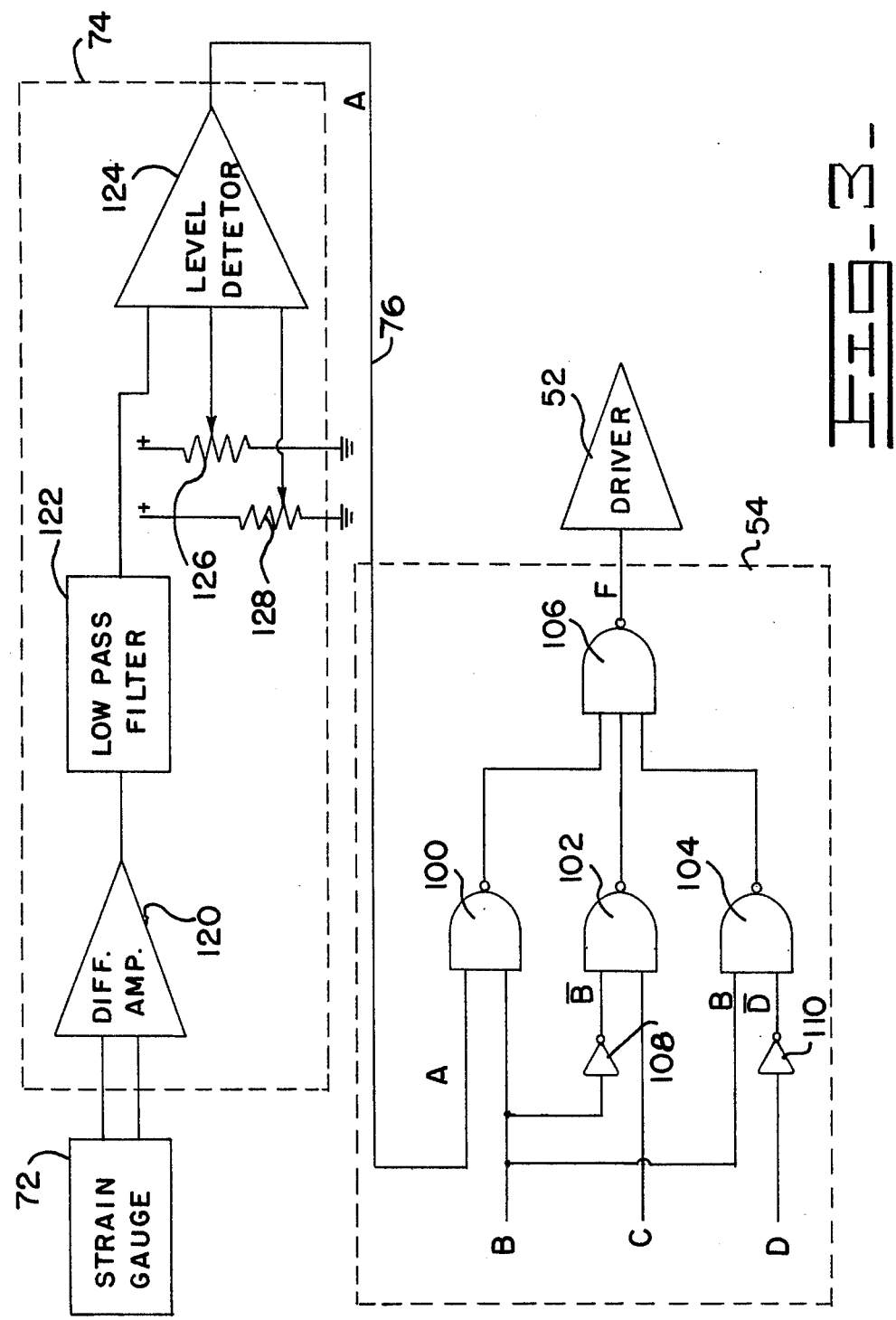
FIG. 3 illustrates in greater detail certain of the components of the system illustrated in block form in FIG. 2.

FIG. 3 illustrates the makeup of the logic system 54 for implementing the Boolean equation. Specifically, four NAND gates 100, 102, 104 and 106 are interconnected as illustrated and receive inputs from the lines having the same signal designation illustrated in FIG. 2. For purposes of implementing the logic, inverters 108 and 110 are provided. The arrangement is such that the output of the NAND gate 106 will go true to enable the system, that is, energize the electrical motor 42, for the conditions outlined above.

It is to be understood that while the system illustrated is enabled through energization of the electric motor 42 for driving the pump 40, if, for example, an internal combustion engine were employed in lieu of the motor 42, the driver could be employed to operate an electromagnetic clutch interposed between such an engine and the pump 40, or the pump output could be directed to tank via solenoid operated valve.

FIG. 3 also illustrates the makeup of the overload detector 74. Specifically, the strain gauge provides output signals to a differential amplifier 120 to amplify the difference between the signals provided by the strain gauge 72. The amplified signal is then passed through a low pass filter 122 to a level detector 124, the output of which is indicative of the signal "A" or the absence thereof and which is provided to the NAND gate 100. Potentiometers 126 and 128 are arranged across a regulated source of power (not shown) to act as voltage dividers whereby set points for the output of the level detector 124 are provided so that the signal "A" will be present when a predetermined load condition is not present and a "$\overline{A}$" signal will be present when a load in excess of the predetermined load in corresponding to an overload condition is present.

The low pass filter 122 is employed so that only low frequency changes in signal magnitude are passed to the level detector 124. As is well known, considerable vibration and shock will occur during operation of a lift truck as, for example, during turning movements, passing over irregularities in the underlying terrain, or in movement of the carriage or the mast 28. Such signals will be of high frequency and could cause erroneous indications of an overload condition. Through the provision of the low pass filter, such signals are not passed to the level detector 124 to thereby eliminate such signals and prevent the erroneous indication of an overload condition.

What is claimed is:

1. A lift truck comprising:
   a vehicle frame;
   ground engaging means on said frame whereby said truck may traverse the underlying terrain;
   an upright mast adjacent an end thereof and pivoted to said frame about a substantially horizontal axis;
   a lift carriage mounted on said mast for up and down movement thereon;
   first motor means for tilting said mast toward and away from said end about said axis;
   second motor means for moving said lift carriage up and down on said mast;
   manually operable control means for selectively energizing said first and second motor means;
   overload sensing means on said frame;
   means for sensing when said carriage is above a predetermined position on said mast;
   signal producing means operatively connected to said manually operable control means for providing signals representing tilt toward, tilt away, up and down carriage commands; and
   a logic system connected to and responsive to both said sensing means and said signal producing means for
   (a) preventing energization of said first motor means for tilting in either direction and said second motor for lifting when an overload has been sensed and when said signal producing means are issuing an up carriage command signal;
   (b) allowing energization of said first motor means for tilting toward said frame only when an overload has been sensed and when said carriage is above said predetermined position and when said signal producing means are not issuing an up carriage command signal; and
   (c) allowing energization of said first motor means for tilting in either direction when an overload has been sensed and said carriage is not above said predetermined position.

2. The lift truck of claim 1 wherein said first and second motor means comprise hydraulic cylinders, and further including a selectively operable hydraulic pump, said logic system being operative to disable said pump.

3. The lift truck of claim 2 further including an electrical motor for driving said system pump, said logic system being operative to disable said pump by de-energizing said electric motor.

4. A lift truck comprising:
   a vehicle frame having a front end and a rear end;
   wheels on said frame;
   a generally vertically extending mast pivoted to the front of said frame about a generally horizontal axis;
   at least one double-acting hydraulic tilt cylinder interconnecting said mast and said frame whereby said mast may be tilted forward and rearwardly on said frame;
   a load carrying carriage mounted on said mast for up and down movement thereon;
   a hydraulic lift cylinder operatively associated with said carriage for raising said carriage on said mast;
   a hydraulic pump mounted on said frame and adapted to supply hydraulic fluid under pressure to said cylinders;
   a tilt control valve operatively associated with said pump and said tilt cylinder and selectively operable to cause said tilt cylinder to tilt said mast forwardly or rearwardly on said frame;
   a lift control valve operatively associated with said pump and said lift cylinder for causing said lift cylinder to raise or lower said carriage on said mast;
   an electric transducer on said frame for sensing the load on said carriage;
   a pressure sensing switch associated with said lift cylinder for sensing hydraulic pressure therein;
   switch means connected to said tilt control valve for providing signals indicating whether said tilt control valve is causing said tilt cylinder to cause said mast to move forwardly or rearwardly;
   additional switch means connected with said lift cylinder for providing a signal indicating that said lift control valve is causing said lift cylinder to raise said carriage; and
   an electrical logic circuit including a plurality of electrical logic gates connected and responsive to said transducer, said pressure switch, and said switch means for
(a) disabling said pump when said tilt control valve has been operated to cause tilting in either direction of said mast and when said lift control valve has been operated to cause said lift cylinder to lift said carriage and when a predetermined load has been sensed;
(b) enabling said pump, when said only tilt control valve has been operated to cause said tilt cylinder to tilt said mast rearwardly on said frame when said predetermined load has been sensed and when said pressure switch senses a predetermined pressure in said lift cylinder;
(c) enabling said pump when said tilt control valve has been operated to cause tilting of said mast in either direction when said predetermined load has been sensed and when said pressure switch does not sense pressure in excess of said predetermined amount; and
(d) enabling said pump whenever said transducer does not sense a load in excess of said predetermined load.

5. A load handling vehicle, comprising:
a vehicle frame;
ground engaging means on said frame whereby said vehicle may traverse the underlying terrain;
load carrying means adapted to receive a load to be transported by said vehicle;
means mounting said load carrying means for up and down and fore and aft movement relative to said frame;
first motor means for changing the fore and aft attitude of said load carrying means with respect to said frame;
second motor means for elevating said load carrying means with respect to said frame;
manually operable control means for selectively energizing said first and second motor means;
overload sensing means on said frame;
means for sensing when said load carrying means is above a predetermined position with respect to said frame;
signal producing means operatively connected to said manually operable control means and for providing signals representing load carrying means up, down, fore and aft movement commands;
a logic system connected to and responsive to both said sensing means and said signal producing means for
(a) preventing simultaneous energization of said first motor means for changing the attitude of said load carrying means both fore and aft and said second motor means for elevating said load carrying means when an overload has been sensed and when said signal producing means are issuing an up movement command signal;
(b) allowing energization of said first motor means for causing movement of said load carrying means toward said frame only when an overload has been sensed and when said load carrying means is above said predetermined position and when said signal producing means are not issuing an up movement command signal; and
(c) allowing energization of said first motor means for causing both fore and aft movement of said load carrying means when an overload has been sensed and said load carrying means is not above said predetermined position.

* * * * *

UNITED STATES PATENT AND TRADEMARK OFFICE
CERTIFICATE OF CORRECTION

PATENT NO. : 4,093,091
DATED : June 6, 1978
INVENTOR(S) : Edmund Gregg and Grant C. Melocik It is certified that error appears in the above-identified patent and that said Letters Patent are hereby corrected as shown below:

Column 4, line 66, change " $F=(\overline{AB})(\overline{CB})(\overline{BD})$ " to -- $F=(\overline{AB})(\overline{C\overline{B}})(\overline{B\overline{D}})$ --

Signed and Sealed this

Twenty-sixth Day of December 1978

[SEAL]

Attest:

RUTH C. MASON
*Attesting Officer*

DONALD W. BANNER
*Commissioner of Patents and Trademarks*